US011194438B2

(12) United States Patent
Boesel et al.

(10) Patent No.: US 11,194,438 B2
(45) Date of Patent: Dec. 7, 2021

(54) CAPTURE INDICATOR FOR A VIRTUAL WORLD

(71) Applicant: Microsoft Technology Licensing, LLC, Redmond, WA (US)

(72) Inventors: Benjamin Hunter Boesel, Seattle, WA (US); Joshua Benjamin Eiten, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/512,279

(22) Filed: Jul. 15, 2019

(65) Prior Publication Data
US 2020/0356233 A1    Nov. 12, 2020

Related U.S. Application Data

(60) Provisional application No. 62/845,724, filed on May 9, 2019.

(51) Int. Cl.
*G06F 3/0481* (2013.01)
*G06F 3/01* (2006.01)
*G06F 3/0484* (2013.01)
*G06T 15/20* (2011.01)

(52) U.S. Cl.
CPC .......... *G06F 3/04815* (2013.01); *G06F 3/012* (2013.01); *G06F 3/04845* (2013.01); *G06T 15/20* (2013.01)

(58) Field of Classification Search
CPC .. G06F 3/04815; G06F 3/012; G06F 3/04845; G06T 15/20
See application file for complete search history.

(56) References Cited

U.S. PATENT DOCUMENTS

| 7,382,400 | B2 | 6/2008 | Sablak |
| 7,487,468 | B2* | 2/2009 | Tanaka ............... H04N 5/272 345/156 |
| 8,830,142 | B1 | 9/2014 | Kim et al. |
| 9,076,033 | B1* | 7/2015 | Barron ............... H04N 5/23216 |

(Continued)

FOREIGN PATENT DOCUMENTS

| EP | 3422148 A1 * | 1/2019 | .............. G06F 3/01 |
| EP | 3422148 A1 | 1/2019 | |
| WO | 2016191467 A1 | 12/2016 | |
| WO | 2018043135 A1 | 3/2018 | |

OTHER PUBLICATIONS

"3DS Max", Retrieved from: https://knowledge.autodesk.com/support/3ds-max/learn-explore/caas/CloudHelp/cloudhelp/2017/ENU/3DSMax/files/GUID-DA9C808F-87E3-4CA8-9B91-A0F22D664203-htm.html, Jun. 15 2017, 10 Pages.

(Continued)

*Primary Examiner* — Benyam Ketema
(74) *Attorney, Agent, or Firm* — Alleman Hall Creasman & Tuttle LLP

(57) ABSTRACT

Examples are disclosed that relate to computing devices, head-mounted display devices, and methods for displaying a capture indicator within a virtual world. In one example, a method comprises displaying, via a display subsystem, a virtual world; receiving, from a sensor, location data defining a user pose; using the user pose to define a camera pose; generating a capture indicator corresponding to the camera pose; and displaying the capture indicator within the virtual world.

20 Claims, 15 Drawing Sheets

(56) References Cited

U.S. PATENT DOCUMENTS

| | | | |
|---|---|---|---|
| 9,579,574 | B2 | 2/2017 | Barnett et al. |
| 9,857,589 | B2 * | 1/2018 | Lundberg .................. G06F 3/03 |
| 2010/0199232 | A1 * | 8/2010 | Mistry .................. G06F 3/0425 |
| | | | 715/863 |
| 2011/0227820 | A1 | 9/2011 | Haddick et al. |
| 2012/0038663 | A1 * | 2/2012 | Gustafsson .......... G02B 27/017 |
| | | | 345/629 |
| 2015/0309311 | A1 * | 10/2015 | Cho .................... G02B 27/017 |
| | | | 345/8 |
| 2015/0316982 | A1 * | 11/2015 | Miller .................... G06T 15/10 |
| | | | 345/156 |
| 2015/0326932 | A1 * | 11/2015 | Hill .................... H04N 21/8146 |
| | | | 725/32 |
| 2016/0306431 | A1 * | 10/2016 | Stafford .................. G06F 3/014 |
| 2017/0011555 | A1 * | 1/2017 | Li .............................. G06T 1/60 |
| 2017/0249745 | A1 * | 8/2017 | Fiala ........................ A63F 13/25 |
| 2017/0285738 | A1 * | 10/2017 | Khalid ................ G06F 3/04842 |
| 2018/0164593 | A1 | 6/2018 | Van der auwera et al. |
| 2019/0052870 | A1 | 2/2019 | Lutter et al. |
| 2020/0175274 | A1 * | 6/2020 | Laaksonen ................ G06T 7/74 |

OTHER PUBLICATIONS

"Crop Factor Explained", Retrieved from: https://www.photographymad.com/pages/view/crop-factor-explained, Dec. 9, 2018, 5 Pages.

"How to Make the Camera Show Only the Part of the World which is in a Specified Rectangle?", Retrieved from: https://answers.unity.com/questions/964804/how-to-make-the-camera-show-only-the-part-of-the-w.html, May 12, 2015, 3 Pages.

Tanous, Jim, "How to Record 4K Video on the iPhone 6s", Retrieved from: https://www.techjunkie.com/record-4k-iphone-6s/, Oct. 26, 2015, 9 Pages.

"International Search Report and Written Opinion Issued in PCT Application No. PCT/US20/027874", dated Jul. 1, 2020, 12 Pages.

"How to Rec Room—Share Camera Tutorial!", Retrieved From: https://www.youtube.com/watch?v=WKZZC4am8ik?, Jul. 11, 2019, 3 Pages.

"How to Rec Room—Screen Mode Share Camera + Photo Contest!" Retrieved From: https://www.youtube.com/watch?v=tkiMS1xP1p4, Dec. 14, 2018, 3 pages.

* cited by examiner

CAPTURE INDICATOR FOR A VIRTUAL WORLD

CROSS REFERENCE TO RELATED APPLICATIONS

This application claims priority to U.S. Provisional Patent Application Ser. No. 62/845,724, filed May 9, 2019, and entitled "CAPTURE INDICATOR FOR A VIRTUAL WORLD," the entirety of which is hereby incorporated herein by reference for all purposes.

BACKGROUND

Virtual reality (VR) and augmented reality (AR) devices, including head-mounted display (HMD) devices, enable users to view images of detailed virtual worlds. In some examples, it may be desirable to capture a photo or a video of a three-dimensional virtual world. However, it may be hard for a user to understand what portion of the virtual world will be captured.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

Examples are disclosed that relate to computing devices, head-mounted display devices, and methods for displaying a capture indicator within a virtual world. In one example, a method comprises displaying, via a display subsystem, a virtual world; receiving, from a sensor, location data defining a user pose; using the user pose to define a camera pose; generating a capture indicator corresponding to the camera pose; and displaying the capture indicator within the virtual world.

DETAILED DESCRIPTION

Virtual reality (VR) and augmented reality (AR) devices, including head-mounted display (HMD) devices, enable users to view images of detailed virtual worlds. In some examples, it may be desirable to capture and share a photo or a video of a portion of a three-dimensional virtual world as viewed by a user. However, current devices and capture/share tools do not convey to the user what portion of the virtual world will be captured and shared in combination with a complete, unobstructed first-person view of the virtual world.

Figure 1:
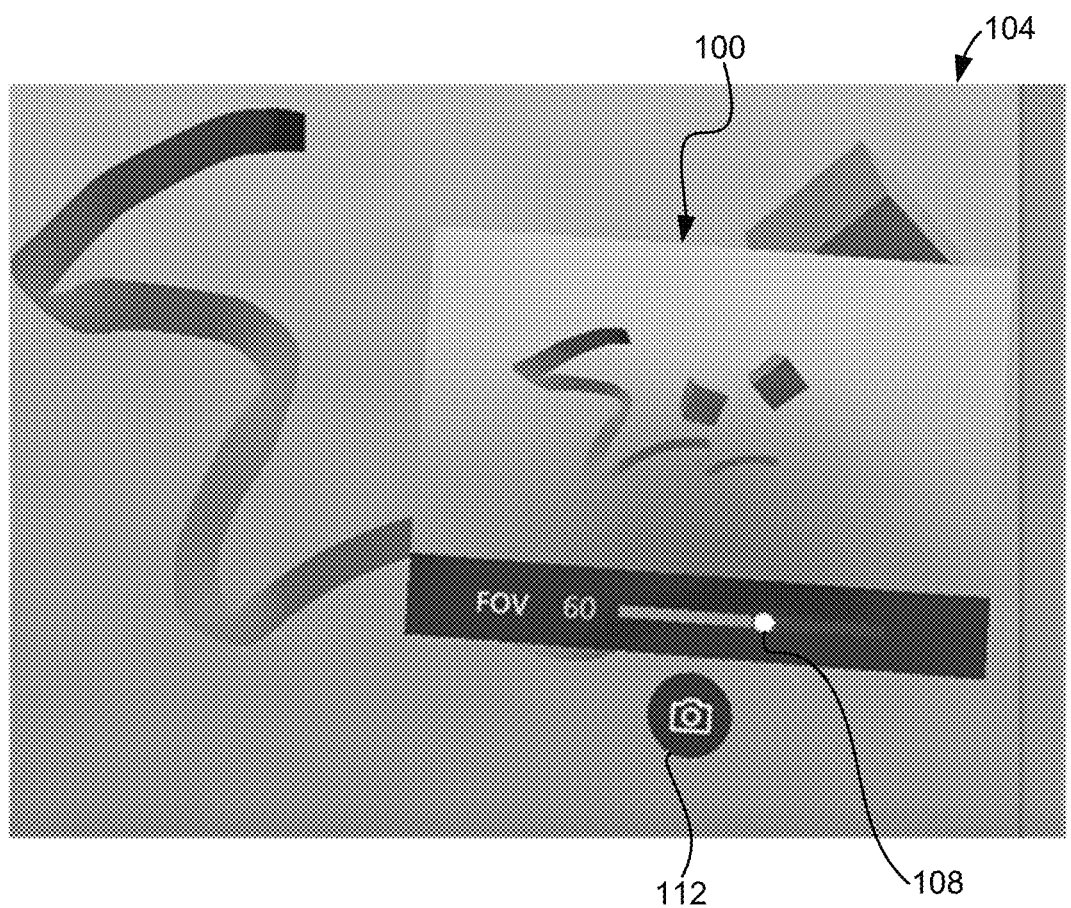
FIG. 1 shows one example of a camera window.

For example, a device may display a camera window superimposed into the user's field of view. With reference now to FIG. 1, one example of a camera window 100 is shown. The camera window 100 displays a flat, two-dimensional image of a portion of a virtual world 104. The image may be captured from a virtual camera that is body-locked to the user's hand. The camera window 100 may include optional user interface elements, such as a field of view (FOV) selector 108 and an image capture button 112. However, the camera window 100 blocks the user's view of the portion of the virtual world over which it is positioned. Further, the flat, two-dimensional image is removed from the actual first-person view that the user is experiencing.

In some examples, it may be desirable to capture pictures or video of a virtual world from a first-person perspective that shows what the user sees from his or her own view. In some examples, capturing images or videos from the first-person perspective may include capturing the images or the videos from a virtual camera located at the user's head. However, the FOV of the virtual camera is smaller than the entire first-person view that the user is viewing (the user's FOV). Accordingly, when the virtual camera is located at the user's head, it may be difficult to provide an intuitive preview of the portion of the virtual world that will be captured in the image or video. Accordingly, it may be difficult for the user to compose the image or video as desired.

Figure 2:
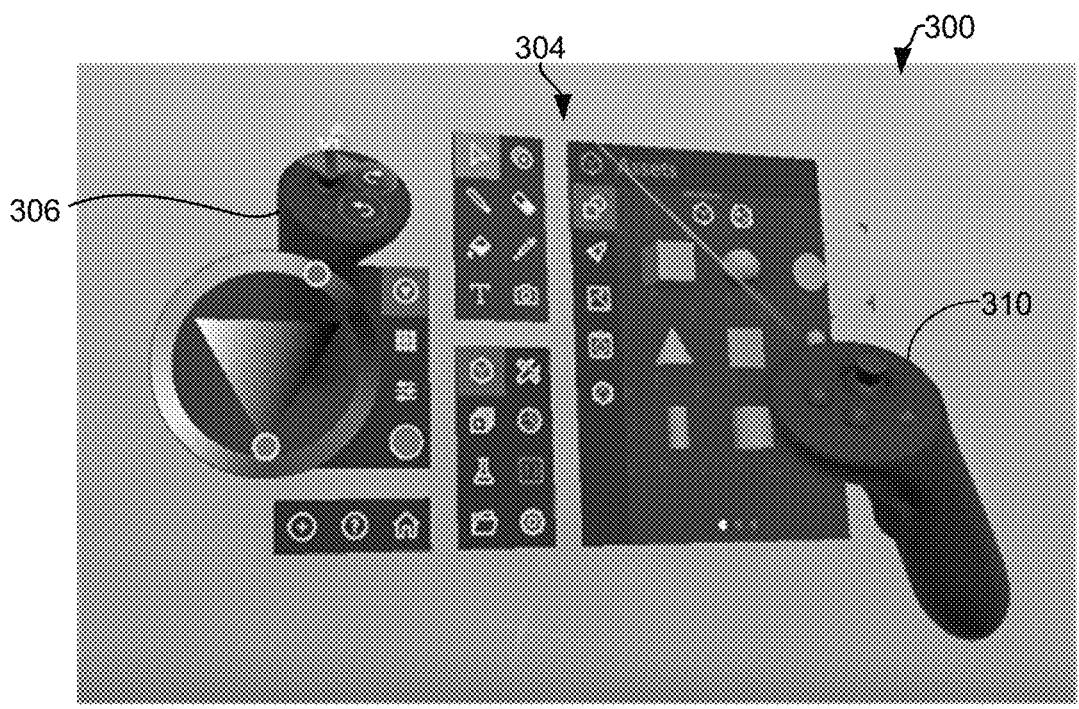
FIG. 2 shows a user's view of a virtual world.

For example and with reference now to FIG. 2, an example of a first-person view of a virtual world 300 as seen by the user of an VR device is shown. The user may interact with the virtual world 300 via a virtual user interface, illustrated in the form of a palette 304. The palette 304 may be body-locked to a pose of a controller that is held in the user's left hand. A virtual controller 306 is displayed to follow the pose of the actual controller held by the user. As described in more detail below, the pose refers to the position and/or orientation of an object in 3 or 6 degrees of freedom. As used herein, the term "user pose" refers to the position and/or orientation of a person's head and/or hand, head-mounted display device, hand-held object, or other body part or device associated with a user. As used herein, the term "camera pose" refers to the position and/or orientation of a virtual camera generated by a VR or AR device.

With continued reference to FIG. 2, a right-handed controller (displayed as virtual controller 310) may be used to operate controls on the palette 304 by pointing the controller 310 at the palette and making selections via one or more buttons on the controller. It will be appreciated that the virtual controller 306 and the virtual controller 310 depicted in FIG. 2 are avatars of real-world controllers held by the user.

Figure 3:
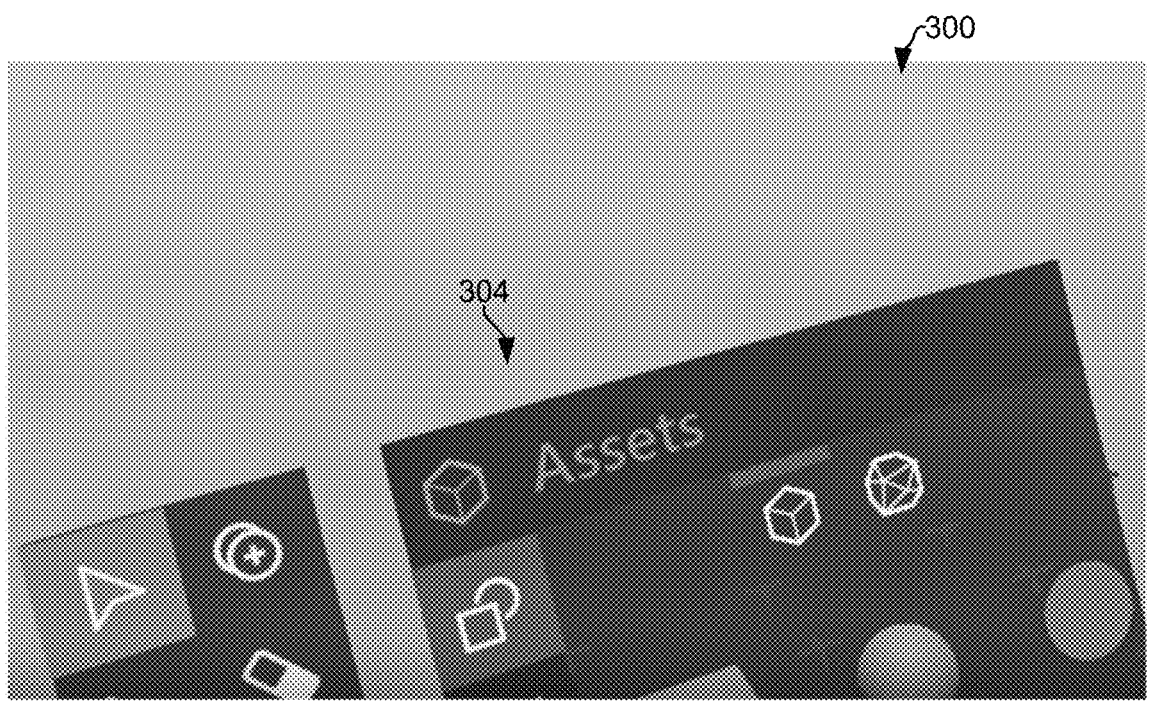
FIG. 3 shows an example of a two-dimensional photo of the virtual world of FIG. 2 captured from a virtual camera located at the user's head.

The user may want to take a photo of the palette 304. However, the user may not know how much of the user's first-person view of the virtual world 300 will be captured in the photo, the orientation of the virtual camera capturing the photo, and/or where the palette 304 is with respect to a frustum or other FOV of the virtual camera that will capture the photo. For example, the user's FOV in VR may be substantially larger than an FOV of the virtual camera. Accordingly, the user may be prone to assuming that virtual objects within his or her FOV are also within the FOV the virtual camera, which in fact may only capture a cropped view of the user's FOV of the virtual world. Accordingly, it may be difficult for the user to know what portion of the complete first-person view the virtual world 300 will be captured. For example, FIG. 3 shows a two-dimensional photo of the virtual world 300 captured by the user, in which only a portion of the palette 304 is visible.

Accordingly, and in one potential advantage of the present disclosure, one or more capture indicators may be displayed as overlaid on the complete, first-person view of the virtual world to clearly communicate to the user what portion of the virtual world will be captured in a photo or video and/or the orientation of the photo or video. In some examples, the capture indicator(s) may be body-locked to the user pose. In this manner and as described in more detail below, the configurations of the present disclosure assist the user in performing the technical task of operating an AR or VR display device to capture and record (as photos and video) specific portions of the image of the first-person virtual or augmented world being displayed to the user via the device. By virtue of the assistance provided by the capture indicators and related techniques, the user is enabled to interact with and cause the display device to capture the particular portions of the virtual world that the user intends to capture. Accordingly, by advantageously guiding the user in her interactions with the display device, the capture indicators and related techniques of the present disclosure assist the user in selecting and capturing defined sections of virtual content displayed in the actual first-person view generated by the device.

As described in more detail below, the capture indicator(s) presented to the user directly relate to a current internal state existing in the display device, namely, the portions of displayed content that are currently within the FOV of the virtual camera. Further and because of this relationship, the capture indicator(s) and related techniques enable the user to properly operate the AR or VR device by capturing the intended portions of content and then sharing, saving, editing or otherwise utilizing this particular content. In this manner, the displayed capture indicator(s) and related techniques facilitate the user's interaction with the device to accomplish the user's intention of selecting and capturing particular virtual content by enabling the user to properly operate the device to capture this content.

Figure 4:
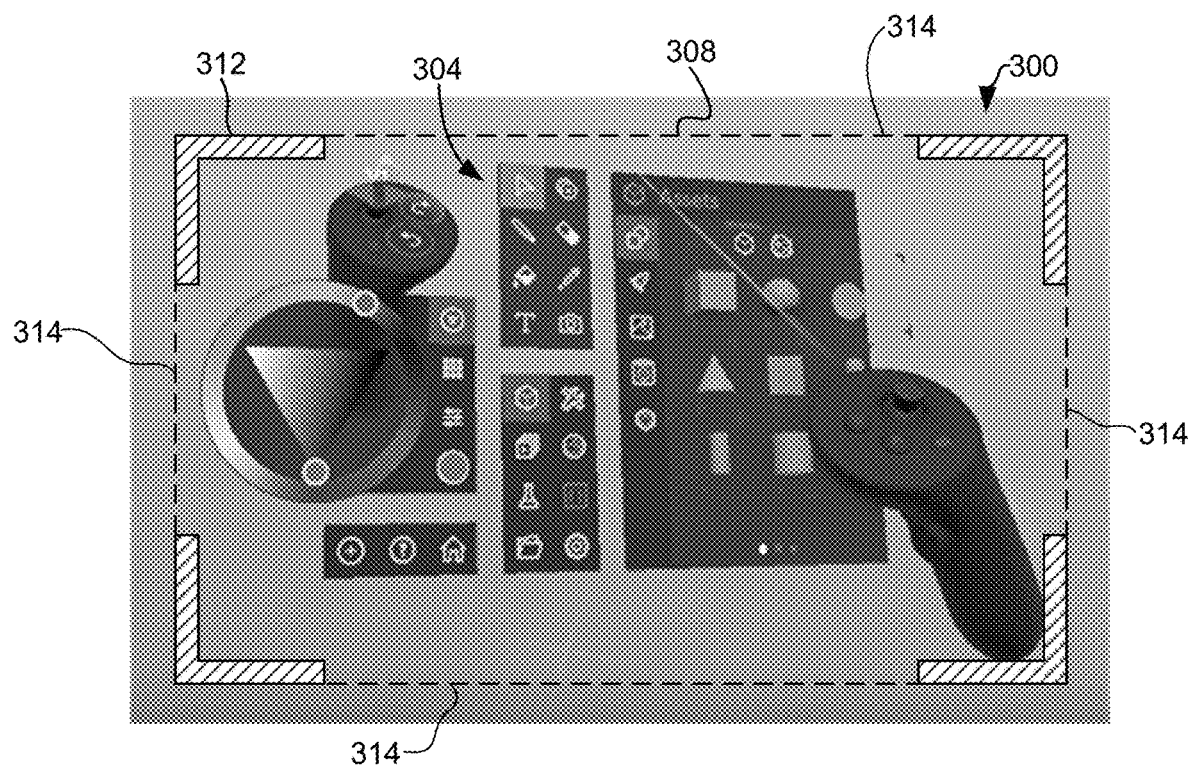
FIG. 4 shows a bounding box overlaid on the user's view of the virtual world of FIG. 2 according to examples of the present disclosure.

As one example, the one or more capture indicators may include a bounding box of a virtual camera frustum originating from the user's head. For example, FIG. 4 shows a bounding box 308 overlaid on the user's first-person view of the virtual world 300 of FIG. 2. The bounding box may outline a footprint or capture area of the camera frustum at a predetermined distance from the user (such as 1 meter, 3 meters, 5 meters, etc.). In this example, the bounding box 308 comprises a rectangle overlaid on the virtual world 300 along a perimeter of the footprint of the camera frustum. The bounding box 308 includes boundary lines 314 that indicate the outer edges of the capture area. In this example the boundary box 308 also includes a plurality of enhanced right-angle corners 312 that highlight the four corners of the bounding box. In other examples and as described in more detail below, many other shapes and configurations of capture indicator(s) may be utilized. Examples include other two-dimensional shapes, such as squares, triangles, circles, ovals, etc., and/or portions of such shapes (such as just the right-angle corners 312 shown in FIG. 4). In other examples and as described below, three-dimensional volumes may be utilized for a capture indicator, such as a sphere, cube, or other volume.

As shown in the example of FIG. 4, the bounding box 308 clearly communicates to the user that the palette 304 and controller 310 are within the camera frustum. Further, the bounding box 308 does not obstruct any portion of the user's first-person view that will be captured by the virtual camera. The bounding box may also include one or more features to help the user compose and capture the photo or video of the palette 304. For example, the size and area captured by the bounding box may be scaled to enable the user to select the camera's FOV and/or aspect ratio. For example, a joystick or touchpad on a virtual reality system controller may be used to change the FOV or a magnification factor of the virtual camera. In other examples, a user interface such as the palette 304 may include one or more options to choose/adjust a FOV and/or aspect ratio for the virtual camera, such as via a list or a switch.

Figure 5:
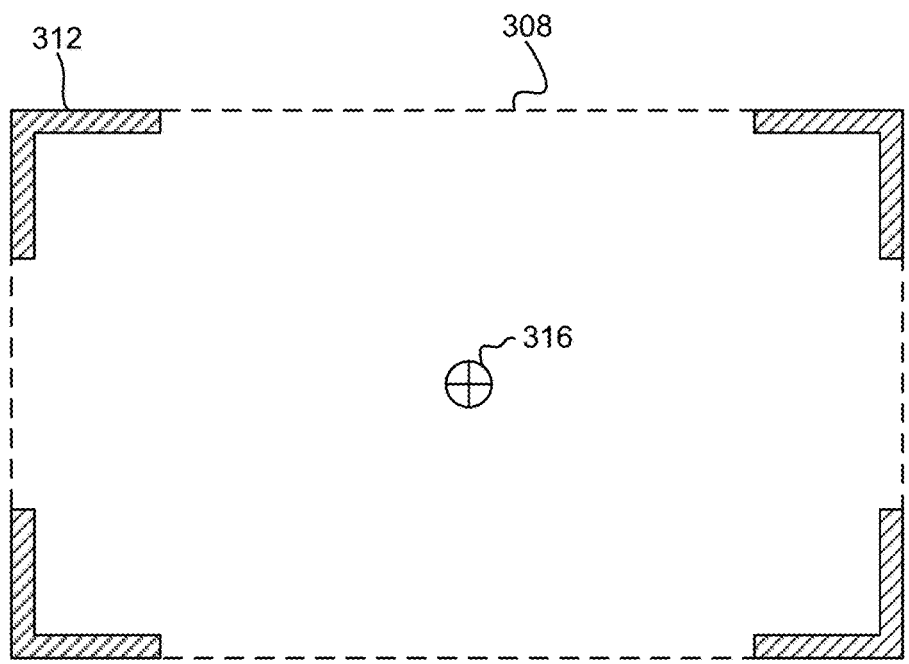
FIG. 5 shows an example of a center indicator according to examples of the present disclosure.

The bounding box 308 may additionally or alternatively include a center indicator that communicates to the user the center of the capture area encompassed by the bounding box. For example, FIG. 5 shows an example of a center indicator in the form of a center reticule 316 centered between the right-angle corners 312 of the bounding box.

Figure 6:
FIG. 6 shows a bounding box and a portion of a virtual palette displayed within another virtual world.

In another example and with reference to FIG. 6, a bounding box 309 is displayed within another virtual world 311 along with a portion of the virtual palette 304. In this example, the bounding box 309 clearly communicates to the user that most of the palette 304 is not within the virtual camera FOV, and therefore would not be captured by a photo or video. Additionally, the bounding box 309 does not obstruct any portion of the user's first-person view of the virtual world.

Figure 10:
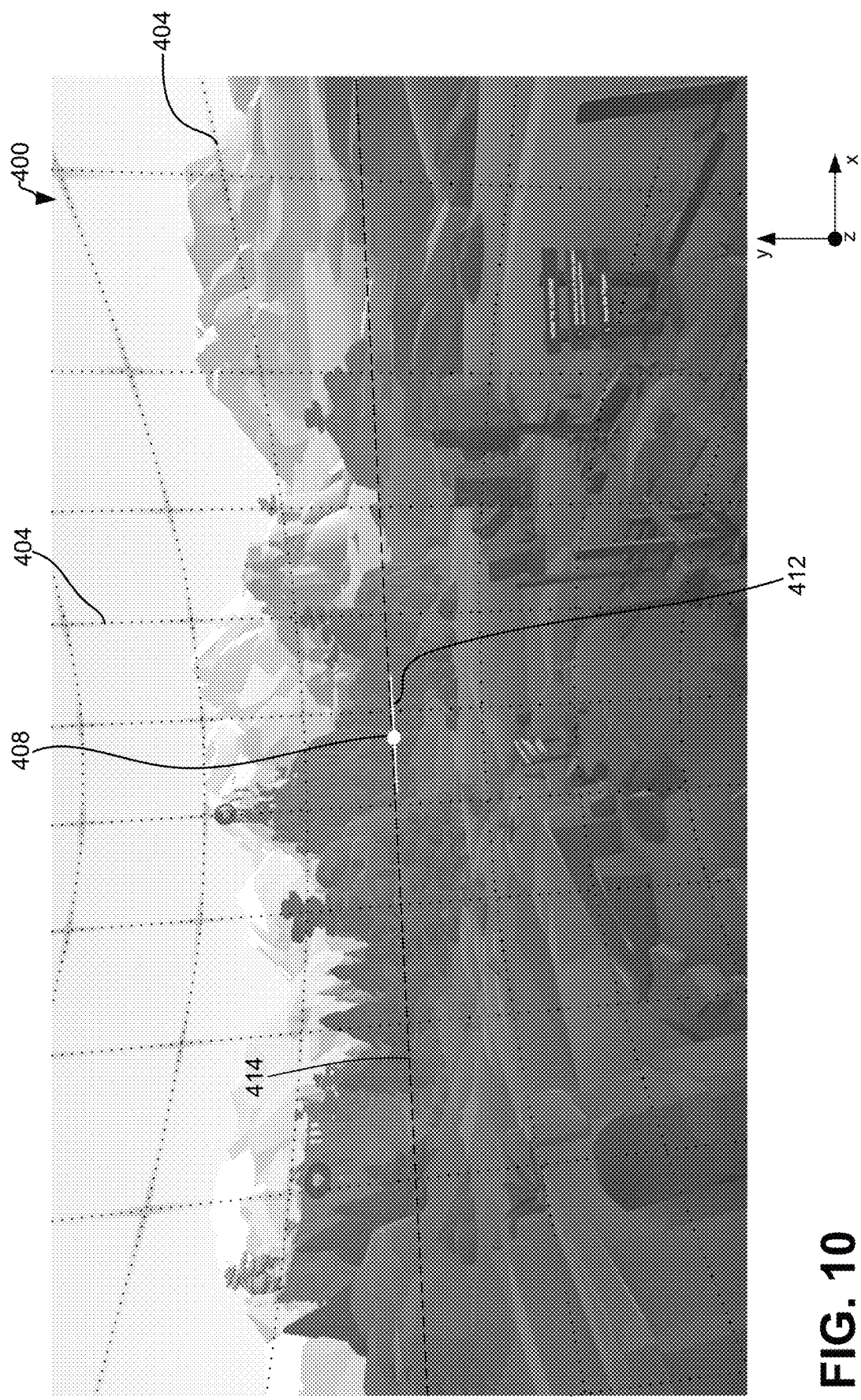
FIG. 10 shows a grid overlaid on a user's view of a virtual world according to examples of the present disclosure.

In some examples, one or more portions of a capture indicator may be displayed in a color different from a background of the virtual world 300 to help the user better perceive the capture area boundaries and area contained within the capture indicator. In the example of FIG. 4, the boundary lines 314 and right-angle corners 312 are displayed in black to provide an easily-perceived visual contrast with the gray background over which they are displayed. In some examples, portions of a capture indicator may comprise different hues or shades of a color at different positions. For example and with reference to FIG. 7, the boundary lines of bounding box 712 may be displayed with a gradually-changing shade of a color, such as blue, along their length. With reference to FIG. 10, gridlines of grid 404 may be displayed with a uniformly-varying shade of a color such that the gridlines are brightest at their intersections.

In other examples, the visual presentation of the capture indicator or one or more portions of the indicator may "shimmer" or otherwise vary over time. In yet another example, a color of one or more background pixels of the virtual world that are underneath the capture indicator may be sampled. Based on the sampled color, a different, contrasting color may be selected and used to display the portion of the capture indicator at that location. In this manner, the capture indicator may be displayed in an easily-perceived color that contrasts with the background.

Figure 7:
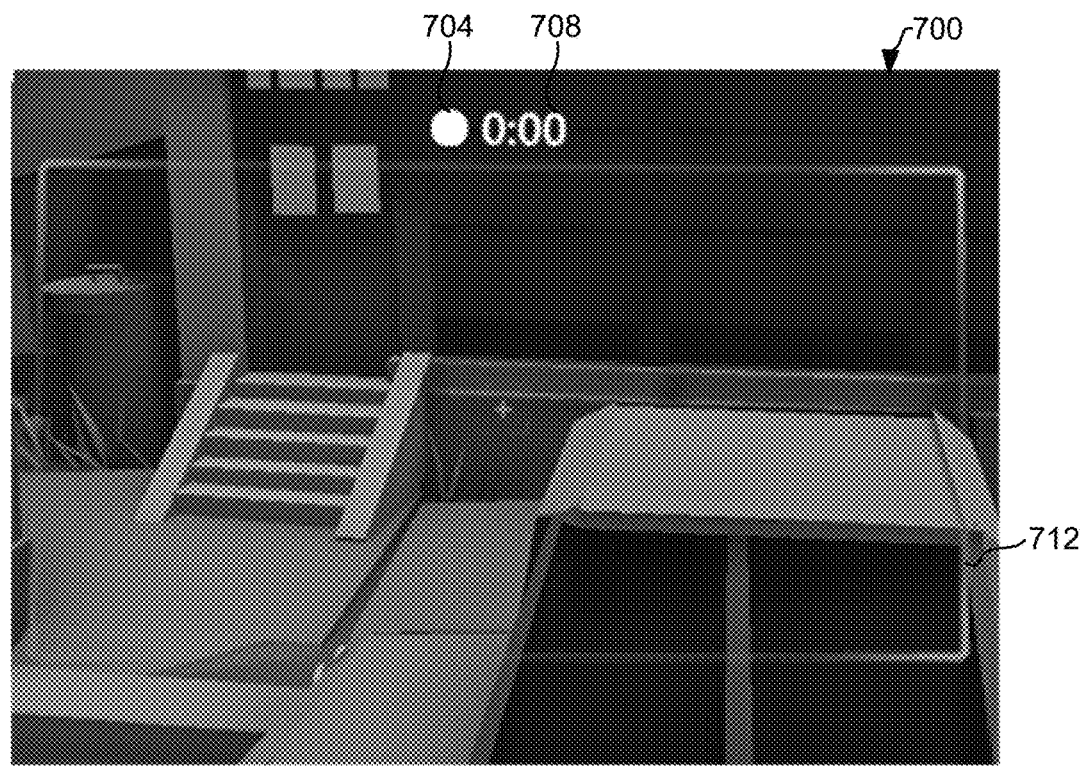
FIG. 7 illustrates a plurality of features to indicate that the user is recording a video according to examples of the present disclosure.
Figure 8:
FIG. 8 shows the features of FIG. 7 indicating that recording is in progress.

In some examples, the portions of the virtual world displayed outside the perimeter of the capture indicator may be blurred. In other examples, the portion of the virtual world within the capture indicator may be blurred. In this manner, by using one or more of the above techniques, the user may readily and intuitively recognize the area contained within the capture indicator. Any other suitable techniques may additionally or alternatively be used to make the capture indicator conspicuous to the user, In some examples, one or more capture indicators may include one or more features to indicate to the user that she or he is recording a video. For example, as illustrated in FIG. 7, the one or more capture indicators may include a recording icon 704 and a timer 708 displayed along with bounding box 712 to indicate that the user is recording, or is about to record, a video of virtual world 700. In some examples, as illustrated in FIG. 8, the recording icon 704 and/or the bounding box 712 may change color or hue to indicate that recording is in progress. For example, the recording icon may change from white to red or any other suitable color to indicate that recording is in progress.

Figure 9:
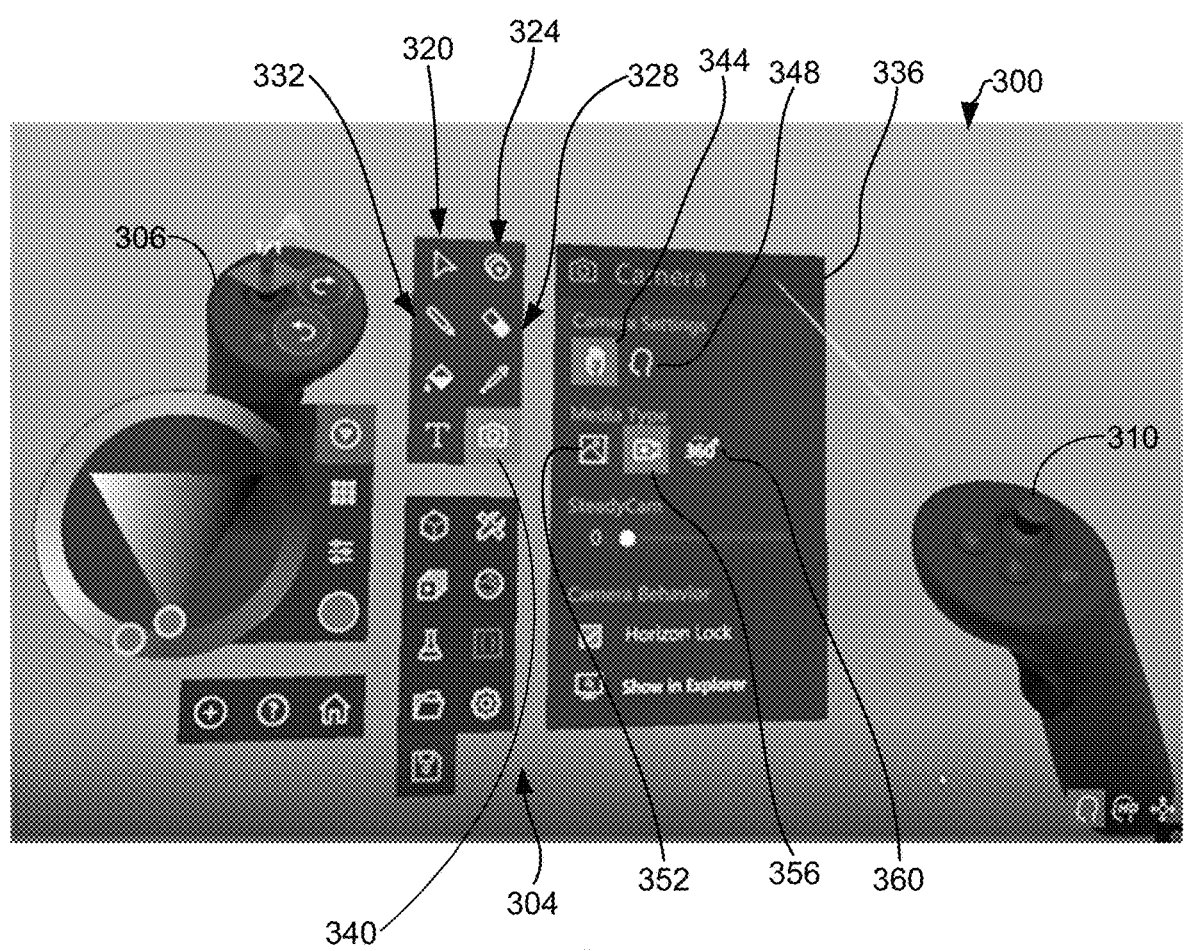
FIG. 9 shows an example of a camera control menu on a virtual palette according to examples of the present disclosure.

These and other options may be controlled via a user interface, such as the palette 304. FIG. 9 shows an example of a camera control menu on the palette 304 and controller avatars 306, 310. The palette 304 may include various tools to build and edit objects in the virtual world 300. The palette 304 may include a shape tool 320 to bring shapes into a scene and build spatial scenarios, a clone tool 324 to drag and duplicate virtual objects, an eraser tool 328 to select and erase/delete shapes, a drawing tool 332 to click and drag for drawing lines or painting, and any other suitable tools. The palette 304 may be body-locked to a controller configured to be held in one of the user's hands, and the one or more tools may be selected and/or operated by a controller configured to be held in the user's other hand.

When a tool is selected, the palette 304 may show a detail box 336 showing a set of options based on the tool. For example, the palette 304 includes a camera tool 340 to control the one or more capture indicators and capture still photos and/or videos of the virtual world 300. When the camera tool 340 is selected, the detail box 336 enables the user to select one or more operational modes for the camera. For example, the detail box 336 may include a hand option 344 to take a photo or video from a virtual camera locked to a pose of the user's hand. The detail box 336 may also include a head option 348 to take a photo or video from a virtual camera locked to a pose of the user's head. The detail box 336 may also indicate a media type to be captured. For example, the detail box 336 may include a photo option 352 selectable to configure the virtual camera to take still, 2D photos of the virtual world, a video option 356 selectable to configure the virtual camera to take videos, and a 360° option 360 selectable to configure the virtual camera to take a 360° photo or video of the virtual world.

In some examples, it may be useful to take a 360° photo, so that others who may not have access to a virtual or augmented reality headset may observe the user's surroundings in the virtual world. In one example, the user may take a 360° photo picture from a virtual camera located at and body-locked to the user's head. In this example, one or more capture indicators may be overlaid on the virtual world to indicate that the user is taking a 360° photo. As one example, the one or more capture indicators may include a grid that is overlaid around the user to indicate an orientation of a 360-degree image. For example, FIG. 10 shows a portion of a curved grid 404 overlaid on a real-time first-person view of the virtual world 400. The grid 404 may help the user position and orient features of the virtual world 400, and clearly communicates to the user that they are in 360-degree image capture mode. In other examples, other suitable patterns may be used.

In some examples, the one or more capture indicators may additionally or alternatively include a default forward indicator to indicate where a "default forward" direction is in the 360-degree image. In the example of FIG. 10, a default forward indicator in the form of white dot 408 is displayed. In this manner, a user may know that this location will be the center of the image. In some examples, the default forward indicator 408 may be body-locked to a pose of the user's head to keep the image centered on the center of the user's field of view.

In a 360-degree image capture mode, the one or more capture indicators may also include a visually distinctive center line to indicate an orientation of the image with respect to a horizon. In the example of FIG. 10, a horizontally-oriented center line 412 is displayed in white extending from opposing sides of white dot 408. In this manner, the user may easily perceive and determine an attitude of the scene before capturing the photo. As noted, the center line 412 may be displayed in a different color to indicate the orientation of the 360-degree image. For example, the grid 404 may comprise blue colored lines and the center line 412 may comprise a white line. In some examples, the color may fade from the grid 404 into the center line 412 to clearly indicate the default forward direction.

In some examples, the virtual camera and/or the grid 404 may be body-locked to the user's head pose, which may be determined by the HMD device, external camera(s), or other suitable method as described below. The virtual world 400 may be represented with respect to a virtual world coordinate system that may be fixed with respect to a real-world coordinate system of the user's physical environment.

As described in more detail below, one or more cameras on an HMD device, and/or one or more external imaging systems, such as cameras mounted in a surrounding environment, may be used to visually track a pose of the HMD device. Additionally, one or more sensors, such as an IMU that may include an accelerometer, gyroscope, magnetometer, and/or other suitable sensors, may provide output related to changes in a pose of the HMD device.

The "pose" of the HMD device refers to its orientation in three degrees of freedom (3DoF) or its orientation and position in six degrees of freedom (6DoF) within a three-dimensional environment. With 3DoF tracking, the orientation of the HMD device is tracked by monitoring rotation around the X, Y, and Z axes, or pitch, yaw, and roll/tilt. In 3DoF tracking, the position and translation of the device along the X, Y, and Z axes are not tracked. In 6DoF tracking, the position and translation of the device along the X, Y, and Z axes is also tracked. Aspects of the present disclosure may be practiced with 3DoF and 6DoF tracking systems.

In some examples, aspects of the present disclosure may utilize an HMD device that comprises an IMU configured as a three-axis or 3DoF position sensor system. This example position sensor system may, for example, include three gyroscopes to indicate or measure a change in orientation of the HMD device within three-dimensional space about an X, Y, and Z axis. In another example, an HMD device may comprise an IMU configured as a six-axis or 6DoF position sensor system. This example position sensor system may, for example, include three accelerometers and three gyroscopes to indicate or measure a change in location of the HMD device along the three orthogonal axes and a change in the device's orientation about the three axes. The HMD device may use 3DoF tracking to determine whether a user turns her head left or right (yaw), rotates it up or down (pitch), or tilts it left or right (roll). Movement along the X, Y, and Z axes may be additionally monitored using 6DoF tracking to determine whether the HMD device moves laterally, vertically, forward, or backward.

In some examples, when capturing a photo or video from a virtual camera locked to a pose of the user's head, the user's natural head movements may introduce unwanted rotations and/or jitter to the captured images. Accordingly, in some examples, the virtual camera and capture indicator(s) may also be locked to the horizon of a virtual world to maintain the camera and capture indicator(s) level with the horizon. In other words, the virtual camera pose and corresponding capture indicator(s) pose may follow and match the changing yaw and pitch of the user's head, while ignoring any changes in roll about the z-axis. In this manner, when the user tilts/rolls her head, the rendered capture indicator(s) remain level with the horizon.

The horizon may be determined in any suitable manner. For example, when an HMD device is calibrated, it may determine its orientation with respect to the real world. For example, the HMD device may calibrate itself using sensor fusion, accelerometer, gyroscope, and/or other sensor data, and/or image data captured from external cameras. In one example, the device may set the horizon to be locked to a real-world horizon. For example, the device may determine up and down directions, and set the horizon as a centerpoint between the up and the down directions.

With reference again to FIG. 10, when a horizon lock feature as described above is engaged, the virtual camera and grid 404 are fixed to stay parallel with the horizon (indicated as dotted line 414 in FIG. 10). In this manner, the displayed grid 404 may be allowed to pitch and yaw with the user's natural head movements, but may be prevented from rolling about the z-axis.

In some examples and for some applications, the virtual camera and the grid 404 may be fixed to a virtual horizon that changes its orientation. For example, the user may be running a flight simulator application, in which the virtual horizon changes relative to the real-world horizon, such as when the flight simulator performs a barrel roll. As described below with respect to example devices, various suitable methods may be used to orient a virtual world via sensor input from one or more devices.

In some examples when capturing video, undesirable jitter from the user's natural head movements may be dampened by engaging a smoothing algorithm to update the camera pose. For example, the virtual camera may reference the position and rotation of the user pose (HMD/user head pose) in space. The virtual camera may then linearly interpolate its position/rotation (camera pose) to the user pose over time. In this manner, and where the camera pose is spatially offset from the user pose, the virtual camera's pose will slightly lag behind the HMD/head pose, and appear to the user to only respond to large changes in motion, and not display jitter that occurs between captured frames of image data.

Some examples of smoothing algorithms may utilize linear interpolation functions, such as LRP. For example, two positions may be sampled for each frame to be displayed, such as the position of the virtual camera (using the HMD/head pose) and the position of the user's hand. For each frame, the interpolation function may be applied to interpolate between the two positions. In some examples, the position of the virtual camera may be transformed by the interpolation function to move the virtual camera towards the position of the user's hand, or towards the position of the user's hand plus a predetermined offset variable. The offset variable, frequency of interpolation, and any other suitable variables may be adjusted via the user interface, such as via sliders on the palette 304.

In some examples, it may be desirable to capture 360-degree pictures or video of the virtual world from the perspective of the user's hand. In these examples, the location of the virtual camera may be based on a pose of the user's hand, rather than a pose of the user's head. However, it may be difficult for the user to envision the volume of the 360-degree pictures or video to be captured. Accordingly, and in one potential advantage of the present disclosure, the capture indicator may comprise a real-time spherical preview or orb of a 360-degree image from an origin of the camera pose. This real-time preview may enable the user to easily and intuitively understand the visual volume that is currently available for capture.

Figure 12:
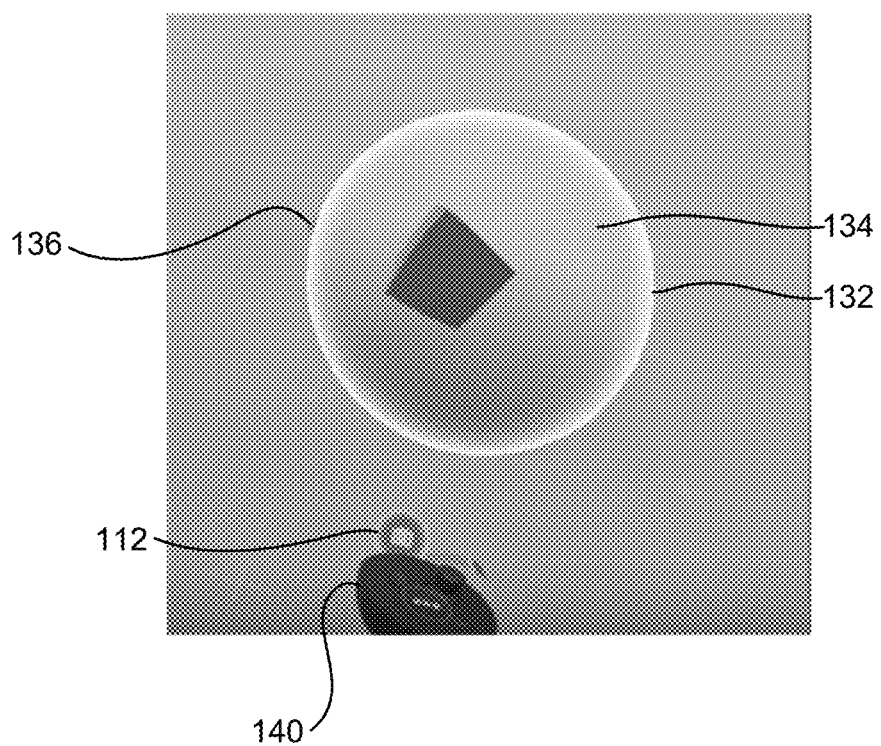
FIG. 12 illustrates one example of a spherical preview of a 360-degree image according to examples of the present disclosure.
Figure 13:
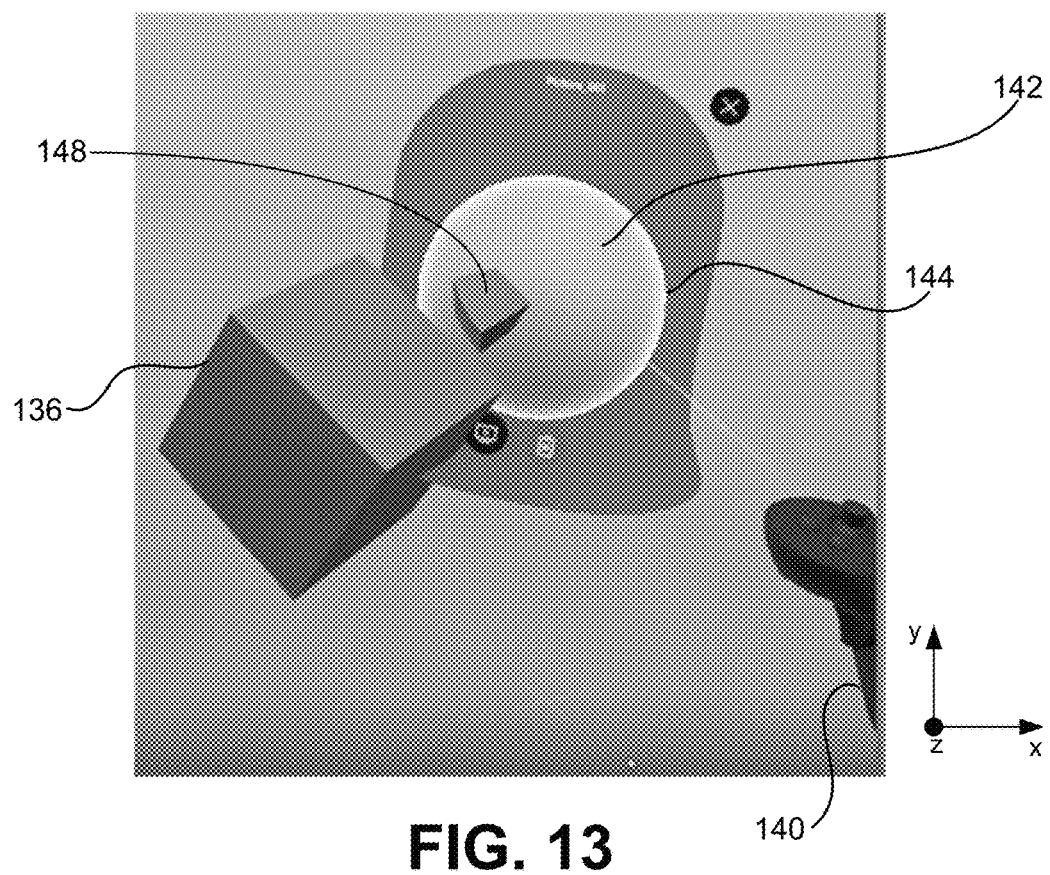
FIG. 13 shows an example of displaying a captured 360-degree image of the virtual world previewed in FIG. 12 on a virtual globe.
Figure 14:
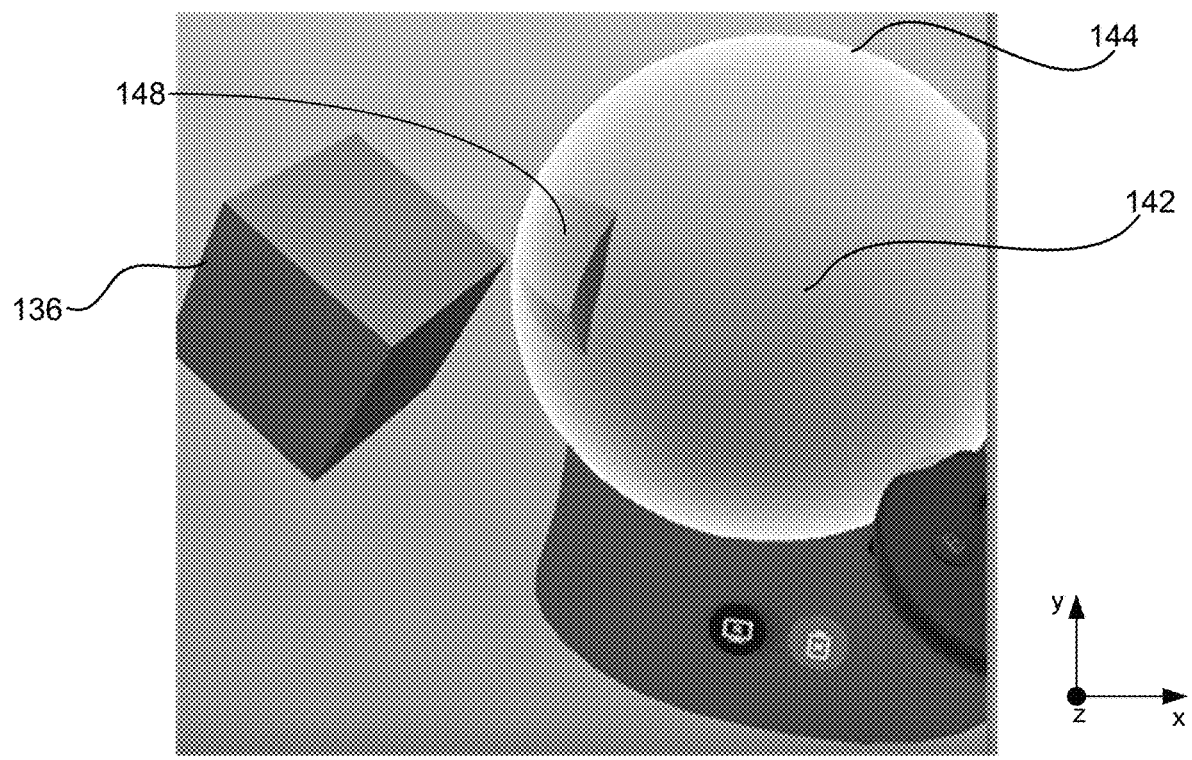
FIG. 14 shows the globe of FIG. 13 after being manipulated according to examples of the present disclosure.

FIG. 12 illustrates one example of a real-time spherical preview 132 of a 360-degree image of a virtual world that includes a virtual cube 136 (see also FIGS. 13 and 14). The spherical preview 132 may comprise a 360-degree image 134 of the virtual world mapped to a surface of a sphere or globe. The spherical preview 132 is body-locked to a pose of the user's controller 140, such that the user may move the spherical preview around the virtual world 138 to see a real-time preview of a 360-degree portion of the virtual world that can be captured. In some examples, the spherical preview 132 may be accompanied by the image capture button 112. By selecting the image capture button 112, the user may capture the 360-degree image.

FIG. 13 shows an example of a captured 360-degree image 142 of the virtual world previewed in FIG. 12, where the image 142 includes a preview image 148 of the virtual cube 136. The captured 360-degree image 142 is displayed via a three-dimensional globe 144 and as mapped to a surface of the globe. In some examples, after the 360-degree image is captured, the globe 144 may then be world-locked to the virtual world or body-locked to the user's head, and released from the user's hand or controller 140. In this manner, the controller 140 may be free to move independently of the globe 144.

In some examples, the user may provide one or more user inputs, such as selecting and dragging or otherwise manipulating the globe with the controller, to view different portions of the captured 360-degree image 142. FIG. 14 shows an example of the globe 144 after being selected and manipulated by the user. As shown in FIG. 14, the globe 144 has been dragged in the positive z-axis direction towards the user. The globe 144 may be dragged, rotated, or moved in any other suitable manner to enable the user to inspect different portions of the 360-degree image 142.

In some examples, a globe 144 comprising a captured 360-degree image may also be utilized and/or shared with other applications and users, including outside a virtual reality experience. For example, the globe 144 may be placed as an object on a web page for a user to inspect on a two-dimensional screen via a browser. In other examples, a 360-degree image captured from the user's head may also be viewed as a sphere in this manner.

Figure 15:
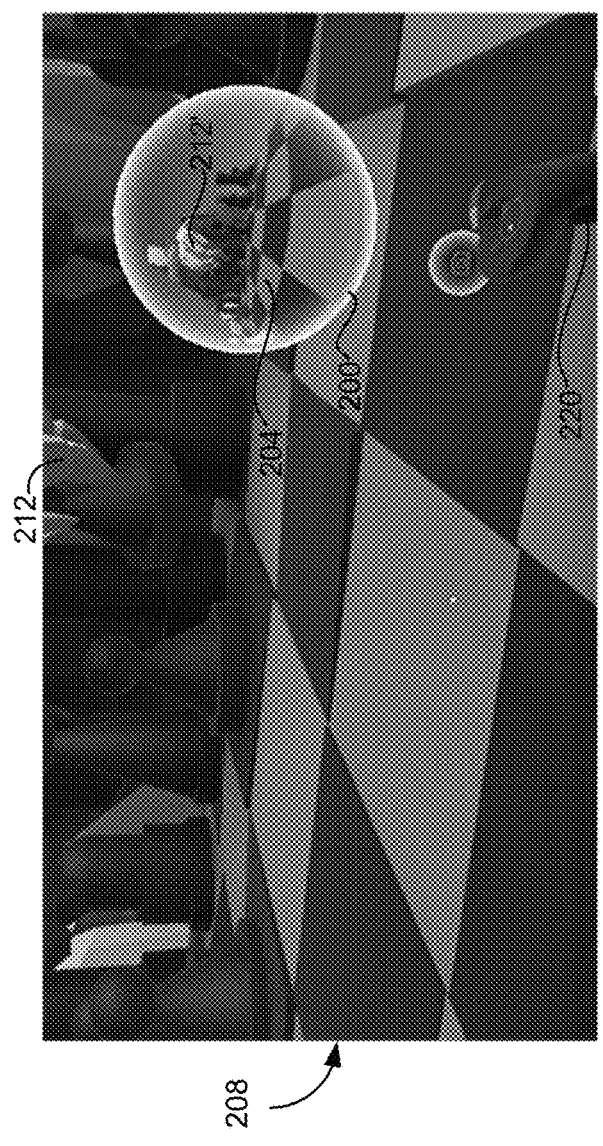
FIG. 15 shows another example of a globe 200 displaying a real-time preview of a 360-degree image of a virtual world according to examples of the present disclosure.
Figure 16:
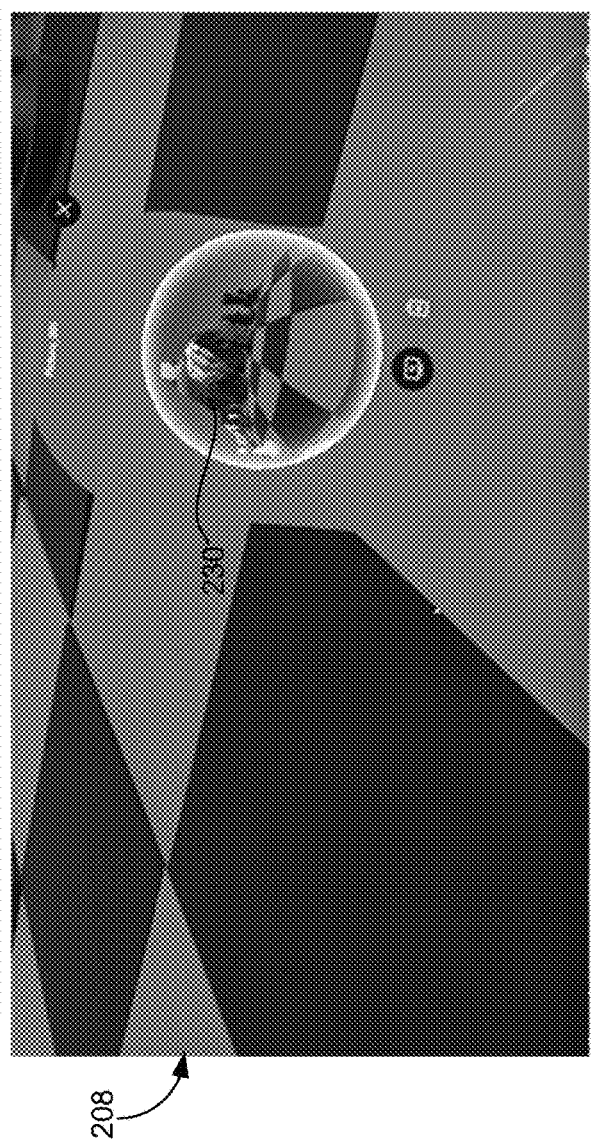
FIG. 16 shows a captured 360-degree image of the preview image shown in FIG. 15 according to examples of the present disclosure.
Figure 17:
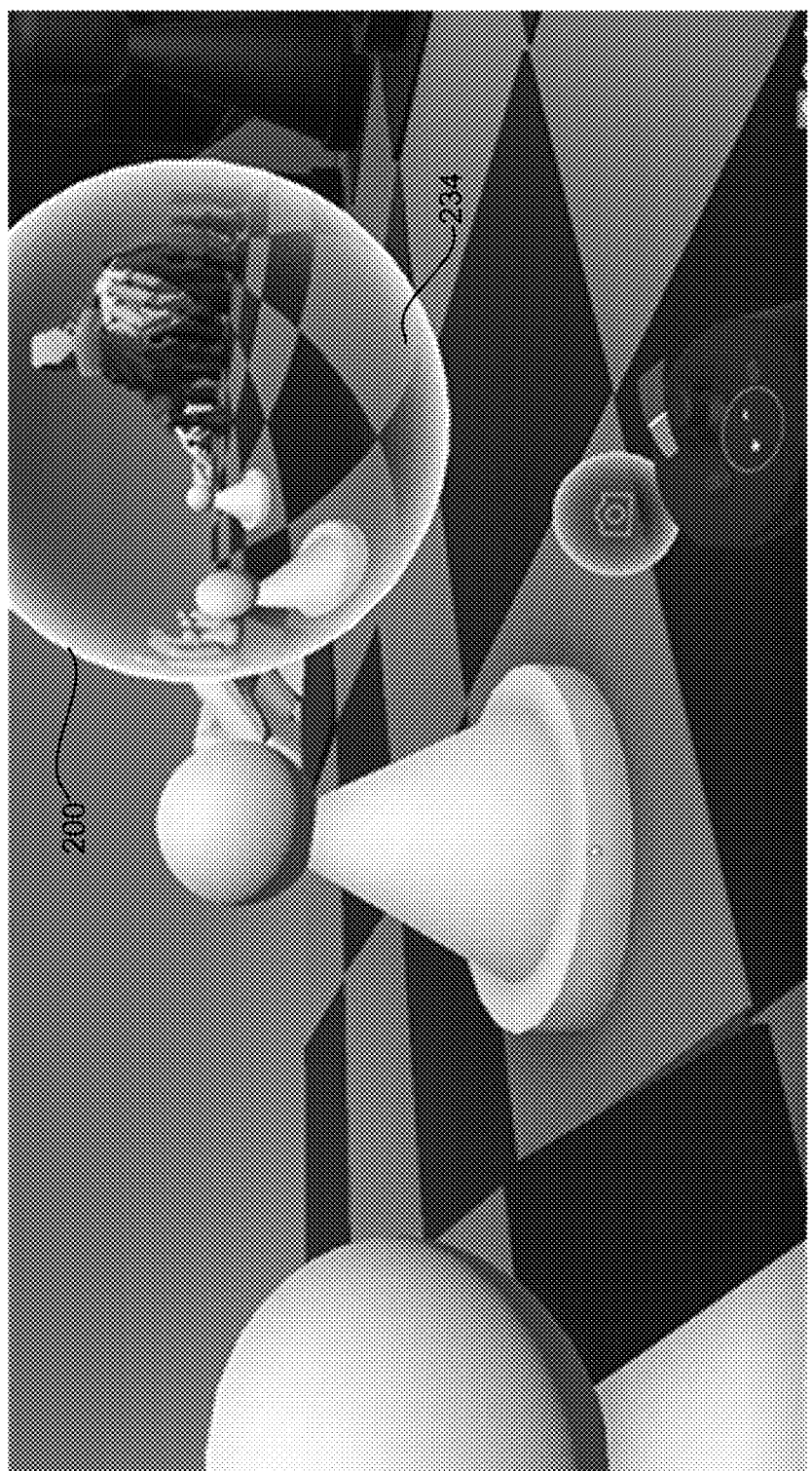
FIG. 17 shows the preview globe moved to another position in the virtual world according to examples of the present disclosure.

FIG. 15 shows another example of a globe 200 that is displaying a real-time preview of a 360-degree image 204 of a virtual world 208. In FIG. 15, the virtual hand 212 of the ghoul is located in front of the virtual camera (which has its origin above the controller avatar 220). Accordingly, the captured ghoul hand 212' is shown in the image preview 204 along with other portions of the virtual chessboard and chess pieces that are within the FOV of the virtual camera. FIG. 16 shows a captured 360-degree image 230 of the preview image shown in FIG. 15. FIG. 17 shows the preview globe 200 moved to another position in the virtual world 208 to show a real-time preview of a different 360-degree image 234 available for capture at this location.

Figure 18:
FIG. 18 shows another example of a globe displaying a real-time preview of a 360-degree image of a virtual world according to examples of the present disclosure.

FIG. 18 shows another example of a preview globe 200 that is displaying a real-time preview of a 360-degree image 240 of a virtual world 250.

It will also be appreciated that capture indicators may take on any other suitable forms. In one example, a capture indicator may comprise a two-dimensional preview of the photos or videos body-locked to a corner of the user's field of view.

Figure 11:
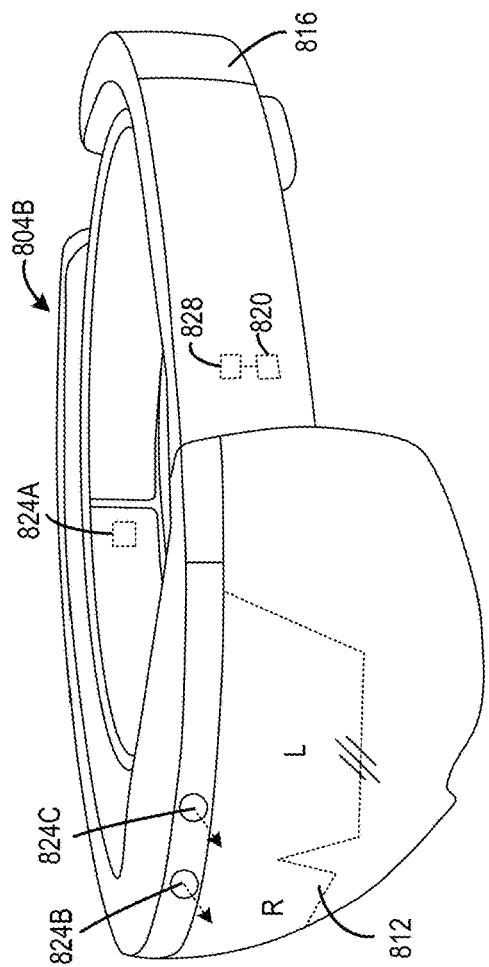
FIG. 11 shows two examples of head-mounted display devices according to examples of the present disclosure.
Figure 11:
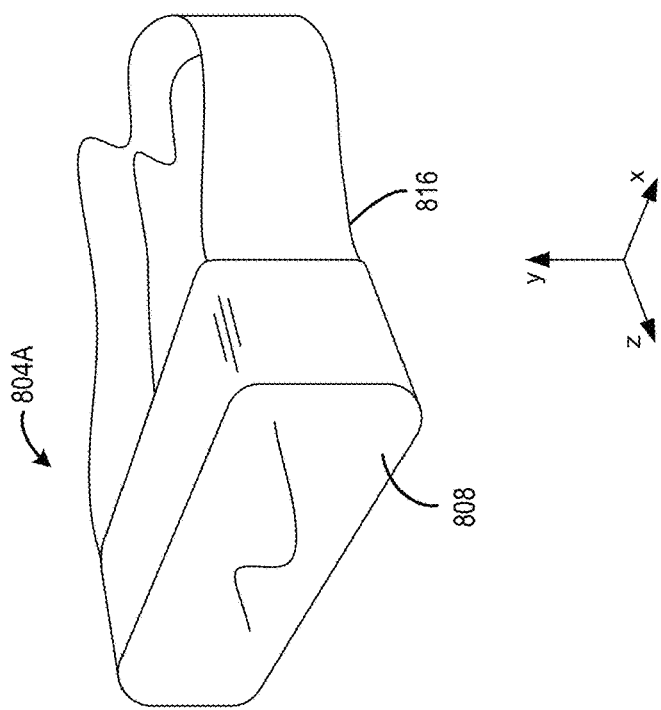

As noted above, aspects of the present disclosure may be practiced by a head-mounted display (HMD) device. The HMD device may take a variety of forms. As illustrated in FIG. 11, the HMD device may take the form of a virtual reality HMD device 804A that includes an opaque, non-see-through display 808. Another example of an HMD device is an augmented reality HMD device 804B that comprises an at least partially transparent display 812 that is configured to enable a wearer of the augmented reality HMD device to view physical, real-world objects in the physical environment through one or more partially transparent pixels displaying virtual object representations. It will be appreciated that the following descriptions of sensors and systems may apply to both the augmented reality HMD device 804B and the virtual reality HMD device 804A.

In the example of FIG. 11, each of the example HMD devices 804A and 804B has a construction that includes a frame 816 that wraps around the head of a user to position a display close to the user's eyes. The frame of virtual reality HMD device 804A may include a rigid portion and an elastic portion, whereas the frame 816 of augmented reality HMD device 804B may be substantially rigid around its circumference. The frame 816 may support additional components such as, for example, a processor 820 and input devices 824A, 824B, and 824C. The processor 820 includes logic and associated computer memory 828 configured to provide images to a display, to receive sensory signals from input devices 824A, 824B, and 824C, and to enact various control processes and/or other aspects of the methods described herein.

The processor 820 may include a logic processor and the two example HMD devices 804 may include volatile memory and non-volatile storage, as discussed in more detail below with respect to the example computing system 1600 of FIG. 20.

With continued reference to FIG. 11, various suitable display technologies and configurations may be used to display images via the displays of the HMD devices 804A and 804B. For example, in virtual reality (VR) HMD device 804A, the display 808 may be an opaque display, such as a non-see-through Light-Emitting Diode (LED) display, a Liquid Crystal Display (LCD), or any other suitable type of opaque or otherwise non-see-through display. In augmented reality (AR) HMD device 804B, the display 812 may include image-producing elements such as, for example, a see-through Organic Light-Emitting Diode (OLED) display, or a liquid crystal on silicon (LCOS) display. In other examples, the AR HMD device 804B may include a light modulator on an edge of the display 812. In this example, the display 812 may serve as a light guide for delivering light from the light modulator to the eyes of a wearer.

The VR display 808 and AR display 812 may include both a left L and right R display in a stereoscopic display configuration. The left L and right R displays each display a view of an augmented reality scene from the perspective of the user's corresponding eye. By viewing the augmented reality scene through the left L and right R displays, the user will perceive virtual objects as being located at particular depths in the real world.

The input devices 824A, 824B, and 824C may include various sensors and related systems to provide information to the processor 820. Such sensors may include an inertial measurement unit (IMU) 824A, one or more image sensors 824B, and one or more ambient light sensors 824C. The one or more outward facing image sensors 824B may be configured to capture and/or measure physical environment attributes of the physical environment in which the augmented reality HMD device 804B is located. In one example, the one or more image sensors 824B may include a visible-light camera configured to collect a visible-light image of a physical space.

In both the AR HMD device 804B and VR HMD device 804A, the position and/or orientation of the device relative to the physical environment may be assessed. In different examples, signals from the IMU 824A, the one or more image sensors 824B, and/or the one or more ambient light sensors 824C may be utilized to provide position and/or orientation data to the processor 820. The position and/or orientation derived from the sensor signals may be used to indicate a rotated device orientation of the HMD device.

Figure 19:
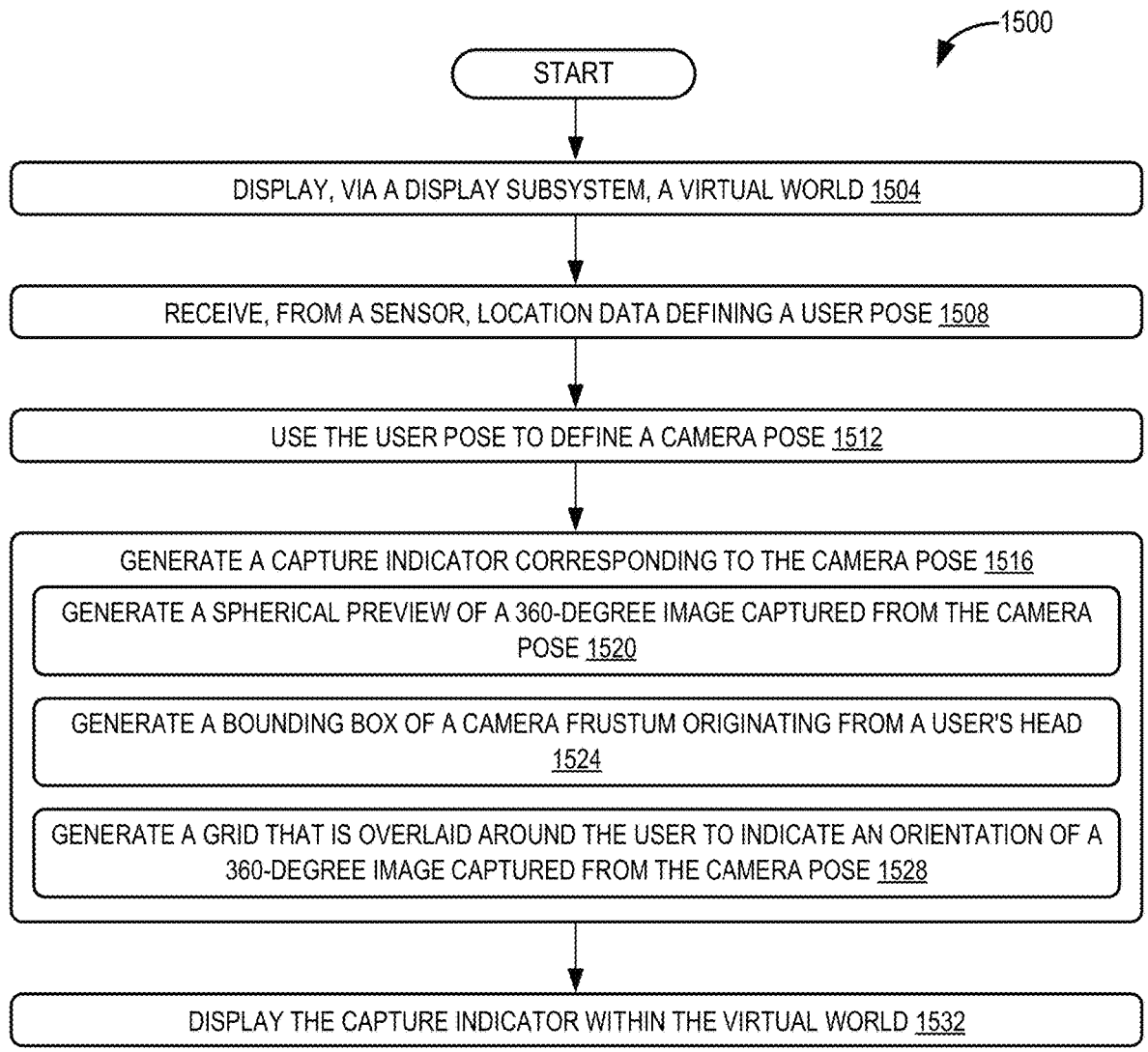
FIG. 19 is a flow chart of an example method for displaying a capture indicator within a virtual world according to examples of the present disclosure.

With reference now to FIG. 19, a flow chart is illustrated of an example method 1500 for displaying a capture indicator within a virtual world. The following description of method 1500 is provided with reference to the software and hardware components described herein and shown in FIGS. 1-18 and 20. It will be appreciated that method 1500 also may be performed in other contexts using other suitable hardware and software components.

At 1504, the method 1500 includes displaying, via a display subsystem, a virtual world. At 1508, the method 1500 includes receiving, from a sensor, location data defining a user pose. At 1512, the method 1500 includes using the user pose to define a camera pose. At 1516, the method 1500 includes generating a capture indicator corresponding to the camera pose.

At 1520, the method 1500 may include, wherein generating the capture indicator comprises generating a spherical preview of a 360-degree image. At 1524, the method 1500 may include, wherein generating the capture indicator comprises generating a bounding box of a camera frustum originating from a user's head. At 1528, the method 1500 may include, wherein generating the capture indicator comprises generating a grid that is overlaid around the user to indicate an orientation of a 360-degree image. At 1532, the method 1500 includes displaying the capture indicator within the virtual world.

It will be appreciated that method 1500 is provided by way of example and is not meant to be limiting. Therefore, it is to be understood that method 1500 may include additional and/or alternative steps relative to those illustrated in FIG. 19. Further, it is to be understood that method 1500 may be performed in any suitable order. Further still, it is to be understood that one or more steps may be omitted from method 1500 without departing from the scope of this disclosure.

In some embodiments, the methods and processes described herein may be tied to a computing system of one or more computing devices. In particular, such methods and processes may be implemented as a computer-application program or service, an application-programming interface (API), a library, and/or other computer-program product.

Figure 20:
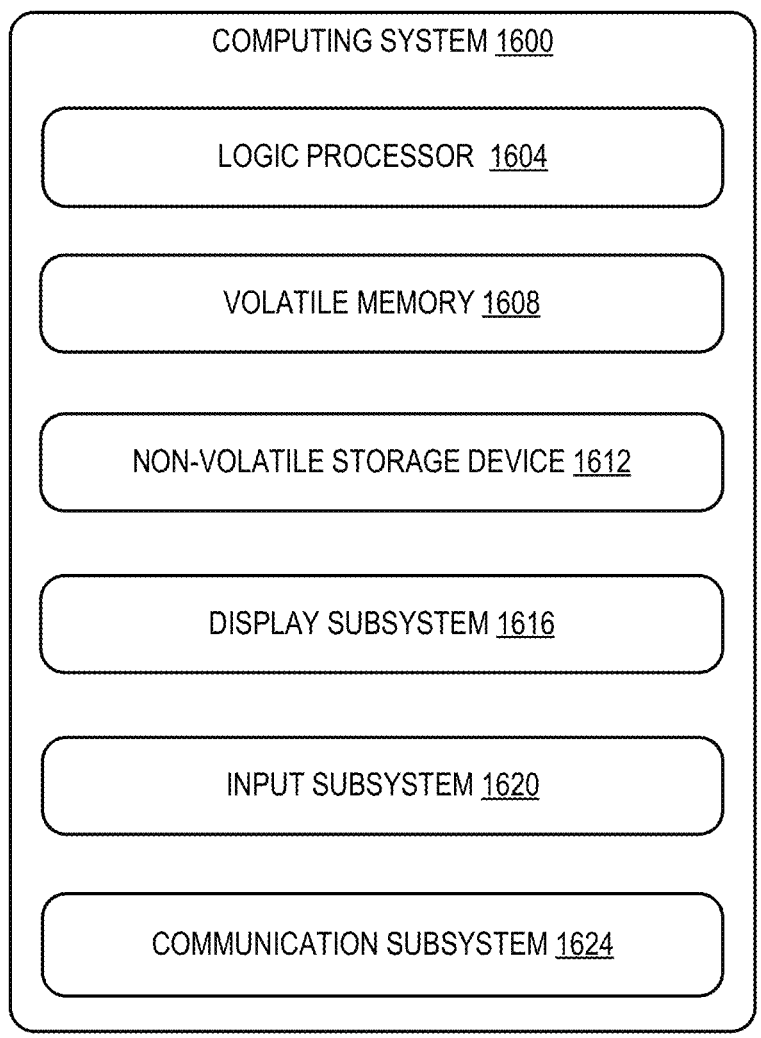
FIG. 20 shows a block diagram of a computing system according to examples of the present disclosure.

FIG. 20 schematically shows a non-limiting embodiment of a computing system 1600 that can enact one or more of the methods and processes described above. Computing system 1600 is shown in simplified form. Computing system 1600 may take the form of one or more gaming consoles, personal computers, server computers, tablet computers, home-entertainment computers, network computing devices, gaming devices, mobile computing devices, mobile communication devices (e.g., smart phones), and/or other computing devices, including wearable computing devices such as smart wristwatches and head mounted display devices. In the above examples, HMD devices 804A and 804B may comprise computing system 1600 or one or more aspects of computing system 1600.

Computing system 1600 includes a logic processor 1604, volatile memory 1608, and a non-volatile storage device 1612. Computing system 1600 may optionally include a display subsystem 1616, input subsystem 1620, communication subsystem 1624 and/or other components not shown in FIG. 20.

Logic processor 1604 includes one or more physical devices configured to execute instructions. For example, the logic processor may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic processor 1604 may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 1604 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Volatile memory 1608 may include physical devices that include random access memory. Volatile memory 1608 is typically utilized by logic processor 1604 to temporarily store information during processing of software instructions. It will be appreciated that volatile memory 1608 typically does not continue to store instructions when power is cut to the volatile memory 1608.

Non-volatile storage device 1612 includes one or more physical devices configured to hold instructions executable by the logic processors to implement the methods and processes described herein. When such methods and processes are implemented, the state of non-volatile storage device 1612 may be transformed—e.g., to hold different data.

Non-volatile storage device 1612 may include physical devices that are removable and/or built-in. Non-volatile storage device 1612 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 1612 may include nonvolatile, dynamic, static, read/write, read-only, sequential-access, location-addressable, file-addressable, and/or content-addressable devices. It will be appreciated that non-volatile storage device 1612 is configured to hold instructions even when power is cut to the non-volatile storage device 1612.

Aspects of logic processor 1604, volatile memory 1608, and non-volatile storage device 1612 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "program" and "application" may be used to describe an aspect of computing system 1600 typically implemented in software by a processor to perform a particular function using portions of volatile memory, which function involves transformative processing that specially configures the processor to perform the function. Thus, a program or application may be instantiated via logic processor 1604 executing instructions held by non-volatile storage device 1612, using portions of volatile memory 1608. It will be understood that different programs and/or applications may be instantiated from the same application, service, code block, object, library, routine, API, function, etc. Likewise, the same program and/or application may be instantiated by different applications, services, code blocks, objects, routines, APIs, functions, etc. The terms "program" and "application" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 1616 may be used to present a visual representation of data held by non-volatile storage device 1612. As the herein described methods and processes change the data held by the non-volatile storage device, and thus transform the state of the non-volatile storage device, the state of display subsystem 1616 may likewise be transformed to visually represent changes in the underlying data. Display subsystem 1616 may include one or more display devices utilizing virtually any type of technology. Such display devices may be combined with logic processor 1604, volatile memory 1608, and/or non-volatile storage device 1612 in a shared enclosure, or such display devices may be peripheral display devices.

When included, input subsystem 1620 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 1624 may be configured to communicatively couple various computing devices described herein with each other, and with other devices. Communication subsystem 1624 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 1600 to send and/or receive messages to and/or from other devices via a network such as the Internet.

The following paragraphs provide additional support for the claims of the subject application. One aspect provides a computing device, comprising: a logic subsystem comprising a processor; and a memory storing instructions executable by the logic subsystem to: display, via a display subsystem, a virtual world; receive, from a sensor, location data defining a user pose; use the user pose to define a camera pose; generate a capture indicator corresponding to the camera pose; and display the capture indicator within the virtual world.

The computing device may additionally or alternatively include, wherein the user pose comprises a position and/or an orientation of a user's hand, and the capture indicator comprises a spherical preview of a 360-degree image. The computing device may additionally or alternatively include, wherein the user pose comprises a position and/or an orientation of a user's head. The computing device may additionally or alternatively include, wherein the capture indicator comprises a bounding box of a camera frustum originating from the user's head.

The computing device may additionally or alternatively include, wherein the capture indicator comprises a grid that is overlaid around the user to indicate an orientation of a 360-degree image. The computing device may additionally or alternatively include, wherein the capture indicator comprises a default forward indicator to indicate a center of the 360-degree image. The computing device may additionally or alternatively include, wherein the capture indicator comprises a center line to indicate the orientation of the image with respect to a horizon. The computing device may additionally or alternatively include, wherein the capture indicator comprises a center indicator to indicate a center of an image captured from the camera pose.

The computing device may additionally or alternatively include, wherein the capture indicator is locked to a horizon and free to follow movement of the camera pose along at least two other axes of movement. The computing device may additionally or alternatively include, wherein the horizon is a real-world horizon, and the instructions are further executable to determine the horizon by determining an up direction, determining a down direction, and setting the horizon as a centerpoint between the up and the down directions.

The computing device may additionally or alternatively include, wherein at least a portion of the capture indicator comprises a color that is different from a background color. The computing device may additionally or alternatively include, wherein the instructions are further executable to: capture a 360-degree image; display a globe comprising the 360-degree image mapped to the globe; receive a user input to manipulate the globe; and in response to receiving the user input, change a pose of the globe to display another portion of the captured 360-degree image.

The computing device may additionally or alternatively include, wherein the camera pose is spatially offset from the user pose, and wherein the instructions are further executable to update the camera pose using a smoothing algorithm. The computing device may additionally or alternatively include, wherein the capture indicator is body-locked to the user pose.

Another aspect provides, at a computing device, a method for displaying a capture indicator within a virtual world, the method comprising: displaying, via a display subsystem, the virtual world; receiving, from a sensor, location data defining a user pose; using the user pose to define a camera pose; generating the capture indicator corresponding to the camera pose; and displaying the capture indicator within the virtual world. The method may additionally or alternatively include, wherein generating the capture indicator comprises generating a spherical preview of a 360-degree image.

The method may additionally or alternatively include, wherein generating the capture indicator comprises generating a bounding box of a camera frustum originating from a user's head. The method may additionally or alternatively include, wherein generating the capture indicator comprises generating a grid that is overlaid around the user to indicate an orientation of a 360-degree image. The method may additionally or alternatively include capturing a 360-degree image; displaying a globe comprising the 360-degree image mapped to the globe; receiving a user input to manipulate the globe; and in response to receiving the user input, changing a pose of the globe to display another portion of the captured 360-degree image.

Another aspect provides a head-mounted display (HMD) device, comprising: a display subsystem; a logic subsystem comprising a processor; and a memory storing instructions executable by the logic subsystem to: display, via the display subsystem, a virtual world; receive, from a sensor, location data defining a user pose; use the user pose to define a camera pose; generate a capture indicator corresponding to the camera pose; and display the capture indicator within the virtual world.

As used herein, the phrase "and/or" means any or all of multiple stated possibilities.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing device, comprising:
a logic subsystem comprising a processor; and
a memory storing instructions executable by the logic subsystem to:
display to a user, via a display subsystem, a first-person view of a virtual world comprising virtual content;
receive, from a sensor, location data defining a user pose of the user;
use the user pose to define a camera pose of a virtual camera generated by the computing device;
generate a capture indicator corresponding to the camera pose, the capture indicator defining a portion of the displayed virtual content of the virtual world;
display the capture indicator overlaid on the virtual world to indicate to the user the portion of the displayed virtual content to be captured, wherein the capture indicator enables the user to see through the capture indicator to the first-person view of the virtual content behind the capture indicator; and
capture a photo or video of the portion of the displayed virtual content within the capture indicator.

2. The computing device of claim 1, wherein the user pose comprises a position and/or an orientation of the user's hand.

3. The computing device of claim 1, wherein the user pose comprises a position and/or an orientation of the user's head.

4. The computing device of claim 3, wherein the capture indicator comprises a bounding box of a camera frustum originating from the user's head.

5. The computing device of claim 1, wherein the capture indicator comprises a grid that is overlaid around the user to indicate an orientation of a 360-degree image.

6. The computing device of claim 5, wherein the capture indicator comprises a default forward indicator to indicate a center of the 360-degree image.

7. The computing device of claim 5, wherein the capture indicator comprises a center line to indicate the orientation of the image with respect to a horizon.

8. The computing device of claim 1, wherein the capture indicator comprises a center indicator to indicate a center of an image captured from the camera pose.

9. The computing device of claim 1, wherein the capture indicator is locked to a horizon and free to follow movement of the camera pose along at least two other axes of movement.

10. The computing device of claim 9, wherein the horizon is a real-world horizon, and the instructions are further executable to determine the horizon by determining an up direction, determining a down direction, and setting the horizon as a centerpoint between the up and the down directions.

11. The computing device of claim 1, wherein at least a portion of the capture indicator comprises a color that is different from a background color.

12. The computing device of claim 1, wherein the instructions are further executable to:
capture a 360-degree image;
display a globe comprising the 360-degree image mapped to the globe;
receive a user input to manipulate the globe; and
in response to receiving the user input, change a pose of the globe to display another portion of the captured 360-degree image.

13. The computing device of claim 1, wherein the camera pose is spatially offset from the user pose, and wherein the instructions are further executable to update the camera pose using a smoothing algorithm.

14. The computing device of claim 1, wherein the capture indicator is body-locked to the user pose.

15. At a computing device, a method for displaying a capture indicator within a virtual world comprising virtual content, the method comprising:
displaying to a user, via a display subsystem, a first-person view of the virtual world;
receiving, from a sensor, location data defining a user pose of the user;
using the user pose to define a camera pose of a virtual camera generated by the computing device;
generating the capture indicator corresponding to the camera pose, the capture indicator defining a portion of the displayed virtual content of the virtual world;
displaying the capture indicator overlaid on the virtual world to indicate to the user the portion of the displayed virtual content to be captured, wherein the capture indicator enables the user to see through the capture indicator to the first-person view of the virtual content; and
capturing a photo or video of the portion of the displayed virtual content within the capture indicator.

16. The method of claim 15, wherein generating the capture indicator comprises generating a bounding box of a camera frustum originating from the user's head.

17. The method of claim 15, wherein generating the capture indicator comprises generating a grid that is overlaid around the user to indicate an orientation of a 360-degree image.

18. The method of claim 15, further comprising:
capturing a 360-degree image;
displaying a globe comprising the 360-degree image mapped to the globe;
receiving a user input to manipulate the globe; and
in response to receiving the user input, changing a pose of the globe to display another portion of the captured 360-degree image.

19. A head-mounted display (HMD) device, comprising:
a display subsystem;
a logic subsystem comprising a processor; and
a memory storing instructions executable by the logic subsystem to:
display to a user, via the display subsystem, a virtual world comprising virtual content;

receive, from a sensor, location data defining a user pose of the user;

use the user pose to define a camera pose of a virtual camera generated by the HMD device;

generate a capture indicator corresponding to the camera pose, the capture indicator comprising a spherical preview of a 360-degree image of the virtual world mapped to a surface of a globe;

display the capture indicator overlaid on the virtual world to indicate to the user the displayed virtual content to be captured; and capture a photo or video of the virtual content within the capture indicator.

20. The HMD device of claim 19, wherein the user pose comprises a position and/or an orientation of the user's hand.

* * * * *